United States Patent
Chatzigrigoriou et al.

(10) Patent No.: US 11,969,907 B2
(45) Date of Patent: Apr. 30, 2024

(54) HANDLE FOR RAZOR MADE OF BIOPLASTIC POLYMERS AND MINERAL FILLERS

(71) Applicants: BIC VIOLEX SINGLE MEMBER S.A., Attiki (GR); SOCIETE BIC, Clichy (FR)

(72) Inventors: Nikolaos Chatzigrigoriou, Anoixi (GR); Julien Gouerec, Boulogne sur Mer (FR)

(73) Assignees: BIC VIOLEX SINGLE MEMBER S.A., Anixi (GR); SOCIETE BIC, Clichy (ER)

( * ) Notice: Subject to any disclaimer, the term of this patent is extended or adjusted under 35 U.S.C. 154(b) by 397 days.

(21) Appl. No.: 17/036,613

(22) Filed: Sep. 29, 2020

(65) Prior Publication Data

US 2021/0094198 A1  Apr. 1, 2021

(30) Foreign Application Priority Data

Sep. 30, 2019  (EP) ..................................... 19306225

(51) Int. Cl.
| | |
|---|---|
| *B26B 21/52* | (2006.01) |
| *C08K 3/013* | (2018.01) |
| *C08K 11/00* | (2006.01) |
| *C08L 23/06* | (2006.01) |
| *C08L 67/03* | (2006.01) |
| *C08L 67/04* | (2006.01) |

(52) U.S. Cl.
CPC ............ *B26B 21/528* (2013.01); *C08K 3/013* (2018.01); *C08K 11/00* (2013.01); *C08L 23/06* (2013.01); *C08L 67/03* (2013.01); *C08L 67/04* (2013.01); *B26B 21/521* (2013.01)

(58) Field of Classification Search
CPC ..... B26B 21/528; B26B 21/521; C08K 3/013; C08K 11/00; C08L 23/06; C08L 67/03; C08L 67/04
USPC ......................................................... 30/526
See application file for complete search history.

(56) References Cited

U.S. PATENT DOCUMENTS

| | | | |
|---|---|---|---|
| 5,922,832 | A | 7/1999 | Randall et al. |
| 2004/0034128 | A1 | 2/2004 | Tokiwa et al. |
| 2005/0154114 | A1 | 7/2005 | Hale |
| 2020/0299504 | A1* | 9/2020 | Munoz ............... B65D 21/0209 |

FOREIGN PATENT DOCUMENTS

| | | |
|---|---|---|
| CN | 107057389 | 8/2017 |
| CN | 108677270 | 10/2018 |
| KR | 20190062906 | 6/2019 |

(Continued)

OTHER PUBLICATIONS

Extended European Search Report dated Jan. 7, 2020 in priority European Patent Application No. 19306225.4, 5 pages.

(Continued)

*Primary Examiner* — Phong H Nguyen
(74) *Attorney, Agent, or Firm* — Ruggiero, McAllister & McMahon LLC

(57) ABSTRACT

A handle for razor is made of polylactic acid (PLA) and another bioplastic polymer such as polybutylene adipate terephtalate (PBAT), bio-polyethylene (bio-PE), and polybutylene succinate (PBS), combined with mineral fillers selected from the group of calcium carbonate and shells of shellfish, such as oyster shells or scallop shells.

12 Claims, 2 Drawing Sheets

(56) References Cited

FOREIGN PATENT DOCUMENTS

| WO | 93/14911 | 8/1993 |
| WO | 2011111881 | 9/2011 |
| WO | 2015057694 | 4/2015 |

OTHER PUBLICATIONS

Extended European Search Report dated Apr. 14, 2020 in priority European Patent Application No. 19306224.7, 7 pages.

\* cited by examiner

[Fig. 1]
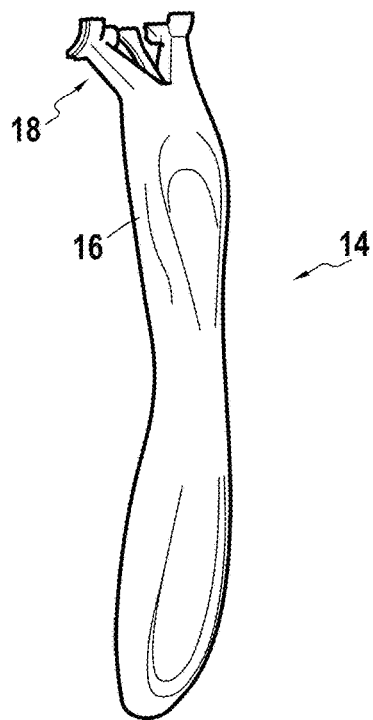
[Fig. 2]
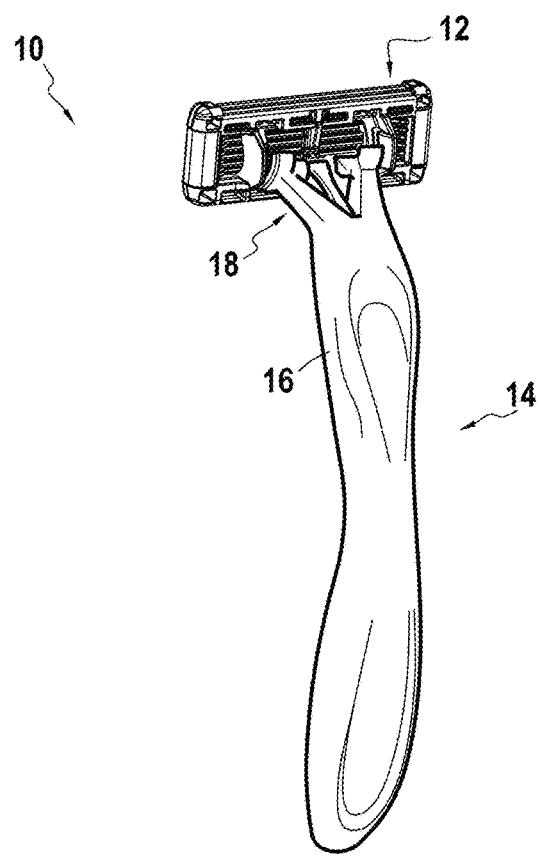

[Fig. 3]
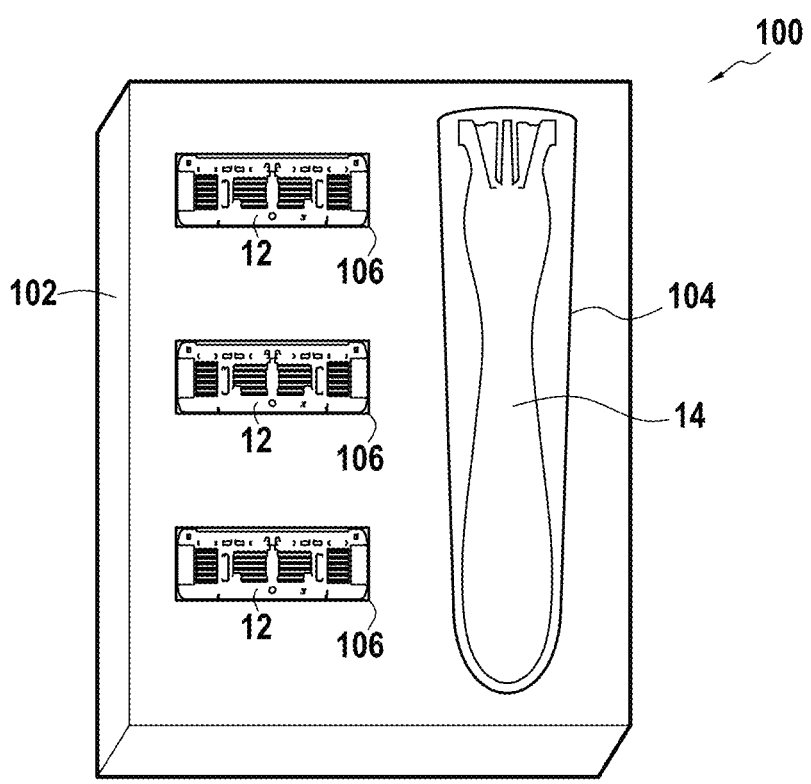

HANDLE FOR RAZOR MADE OF BIOPLASTIC POLYMERS AND MINERAL FILLERS

TECHNICAL FIELD

This application claims benefit from European patent application EP19306225.4 filed on Sep. 30, 2019, its content being incorporated herein by reference.

The present disclosure relates to the field of skincare, and in particular to shaving. More specifically, the present disclosure relates to a handle for razor, a method for manufacturing such handle, a razor including such handle, and a skincare kit including such handle.

BACKGROUND

Disposable skincare devices, such as razors, include generally a handle which represents a major part of the disposable device.

Disposable razor handle represents a major part of a disposable razor and is generally bulky and long enough so as to allow a good handle grip during shaving.

Handles are currently produced by fossil based thermoplastic materials, due to the fact that the materials that belong to this group generally reassure that the final handle will have good mechanical properties, decent surface finish and aesthetics, may be durable enough even when immersed in hot water, while in the meantime may be produced economically and in high volumes.

However, in parallel, such products have a limited lifetime and are fully discarded after their use. As a result, there is a growing concern that disposable razor products might not be sustainable as they are produced using fossil based plastics and have a limited lifetime usage.

A solution might be to reduce the amount of plastic material that is used to produce a razor, and more precisely the handle that is the largest razor component. The material reduction will lead to a lower plastic consumption, thus providing a more sustainable solution.

In addition, it would be beneficial to use bio-based raw materials such as polylactic acid (PLA), known for having properties close to thermoplastic materials usually used for the manufacture of razors, instead of virgin raw materials, thus eliminating the need of consuming fossil based raw materials.

However, these approaches may result in a disposable razor handle with poor ergonomics due to the reduced handle weight. In addition, PLA is known to have poor resistance to hot water, as expressed by its glass transition temperature (Tg) of 60-70° C., and therefore tends to absorb water and become soft, thus having a risk of being deformed when immersed in hot water.

High heat PLA grades overcome these inherent problems since the high crystallinity of these materials allows them to be highly inert and resistant when immersed in hot water. However, high heat PLA requires high cycle times to be processed as the crystallinity is promoted by processing the PLA in warm injection molds for a prolonged curing time so as to allow crystal formation.

This is particularly true for the thick parts of the razor, such as the razor handle. Further to the high processing time, the higher density of PLA may lead to economically non-viable articles because the amount of material mass used is substantially higher than in fossil based plastic articles.

In view of the above, there is a growing need for environmentally sustainable razors comprising a handle with good mechanical properties and durability when immersed in hot water.

SUMMARY

The present disclosure provides a handle for razor. The handle is made of PLA with another bioplastic polymer such as polybutylene succinate (PBAT), bio-polyethylene (bio-PE), and polybutylene succinate (PBS), in specific proportions, combined with an appropriate content of specific mineral fillers.

The use of PLA in combination with another bioplastic polymer allows the handle for razor to be manufactured by using non-fossil based plastics while assuring the adequate mechanical properties for this application. This combination also improves processing by lowering the density of the final material and accelerating cooling time required to prepare the handle.

The presence of mineral fillers reduces the amount of material required to manufacture the handle for razor, and increases the Heat Deflection Temperature (HDT) of the material, allowing it to be inert and to resist to deformations when immersed in hot water. The use of mineral fillers also allows the material to be stiff enough in order to be ejected from the injection machine in shorter cycle times than when using PLA.

BRIEF DESCRIPTION OF THE DRAWINGS

The disclosure may be more completely understood in consideration of the following detailed description of aspects of the disclosure in connection with the accompanying drawings, in which:

FIG. 1 shows a representation of an exemplary handle according to embodiments of the present disclosure;

FIG. 2 shows a representation of an exemplary razor including an exemplary handle; and FIG. 3 shows a representation of an exemplary skincare kit comprising an exemplary handle.

While aspects of the disclosure are amenable to various modifications and alternative forms, specifics thereof have been shown by way of example in the drawings and will be described in detail. It should be understood, however, that the intention is not to limit aspects of the disclosure to the particular embodiment(s) described. On the contrary, the intention of this disclosure is to cover all modifications, equivalents, and alternatives falling within the scope of the disclosure.

DETAILED DESCRIPTION

Reference will now be made in detail to exemplary embodiments of the disclosure, examples of which are illustrated in the accompanying drawings.

Wherever possible, the same reference numbers will be used throughout the drawings to refer to the same or like parts.

As used in this disclosure and the appended claims, the singular forms "a", "an", and "the" include plural referents unless the content clearly dictates otherwise. As used in this disclosure and the appended claims, the term "or" is generally employed in its sense including "and/or" unless the content clearly dictates otherwise.

The following detailed description should be read with reference to the drawings. The detailed description and the drawings, which are not necessarily to scale, depict illustrative aspects and are not intended to limit the scope of the disclosure. The illustrative aspects depicted are intended only as exemplary.

FIG. 1 shows a representation of an exemplary handle 14 for a razor.

The handle 14 may include a body 16 and a connector portion 18. The handle 14 is made of PLA with another bioplastic polymer such as polybutylene succinate (PBAT), bio-polyethylene (bio-PE), and polybutylene succinate (PBS), in specific proportions, combined with an appropriate content of specific mineral fillers chosen in the group consisting of calcium carbonate and shells of shellfish, in particular oyster shells or scallop shells, and more particularly crushed (or milled) oyster shells.

More specifically, the mineral filler is chosen in the group of shellfish shells, in particular crushed (or milled) shellfish shell, preferably oyster shells, more advantageously crushed (or milled) oyster shells, have a volume-average diameter (d50), measured by laser particle sizing, preferably ranging from 10 µm to 160 µm, in particular ranging from 20 µm to 100 µm, more particularly from 30 µm to 80 µm, still more particularly of 70 µm with a Mastersizer 3000 type apparatus commercially available from Malvern. Its content is advantageously between 7% and 20%, more advantageously between 8% and 20%, in particular between 10% and 20%, by weight, with respect to the total weight of the body.

In the exemplary handle 14 of FIG. 1, the content of PLA and bioplastic polymer such as polybutylene succinate (PBAT), bio-polyethylene (bio-PE), and polybutylene succinate (PBS), ranges from 60 to 95% by weight, relative to the total weight of the handle for razor, and the weight ratio PLA/bioplastic polymer ranges from 60/40 to 90/10. The content of mineral fillers ranges from 5 to 40% by weight relative to the total weight of the handle for razor.

FIG. 2 shows a razor 10. The razor 10 may include an exemplary handle 14 and a shaving head 12.

FIG. 3 shows a skincare kit 100. The skincare kit 100 may be housed within a packaging including a support 102 with a base 104 for supporting/storing a handle 14 substantially as described herein and a plurality of cavities 106 for receiving shaving heads 12. In alternatives, the kit may include other type of heads such as exfoliation head, massage head, cooling head and/or any other known skin treatment head configured to be attached with a handle as disclosed herein. In alternatives, different shaving cartridges may be provided in the kit, e.g., a three-blade shaving cartridge, a two-blade shaving cartridge and a four-blade shaving cartridge. Other combinations may also be foreseen as well as other number of cartridges. As represented at FIG. 3, the skincare kit 100 may include three cavities 106 and three shaving heads 12. It is to be understood that the number of cavities 106 and shaving heads is a non-limiting example.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

Although the described embodiments were provided as different exemplary embodiments, it is envisioned that these embodiments are combinable or, when not conflicting, the features recited in the described embodiments may be interchangeable. Moreover, the features recited in the described embodiments are not inextricably linked to one another, unless such a linkage is clearly indicated between two given features.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

The present disclosure thus provides a handle for razor that is made of a composition comprising:

a) from 60 to 95% by weight of a mixture of PLA and a bioplastic polymer chosen in the group consisting of polybutylene adipate terephtalate (PBAT), bio-polyethylene (bio-PE), and polybutylene succinate (PBS), wherein the weight ratio PLA/bioplastic polymer ranges from 60/40 to 90/10, and b) from 5 to 40% by weight of mineral fillers chosen in the group consisting of calcium carbonate and shells of shellfish, specifically oyster shells or scallop shells, and more specifically crushed oyster shells, the weight % being relative to the total weight of the handle for razor.

The handle may be made of a composition comprising:

a) from 80 to 90% by weight of a mixture of PLA and a bioplastic polymer chosen in the group consisting of polybutylene adipate terephtalate (PBAT), bio-polyethylene (bio-PE), and polybutylene succinate (PBS), wherein the weight ratio PLA/bioplastic polymer ranges from 65/35 to 85/15, and b) from 10 to 20% by weight of mineral fillers chosen in the group consisting of calcium carbonate and shells of shellfish, specifically oyster shells or scallop shells, and more specifically crushed oyster shells, the weight % being relative to the total weight of the handle for razor.

The handle for razor may thus comprise PLA, for example commercially available from NaturePlast, in combination with polybutylene adipate terephtalate (PBAT) for example commercially available from NaturePlast, or bio-polyethylene (bio-PE) for example commercially available from Braskem, or polybutylene succinate (PBS) for example commercially available from NaturePlast, in a weight ratio of PLA/bioplastic polymer ranging from 60/40 to 90/10, specifically from 65/45 to 80/20, more specifically from 65/35 to 85/15, more specifically from 70/30 to 80/20, and even more specifically in a weight ratio of 70/30. Specifically, the handle for razor may comprise PLA in combination with bio-polyethylene (bio-PE), in a weight ratio of PLA/bio-PE ranging from 60/40 to 90/10, specifically from 65/45 to 80/20, more specifically from 65/35 to 85/15, more specifically from 70/30 to 80/20, and even more specifically in a weight ratio of 70/30.

The bio-polyethylene (bio-PE) may be partially or completely bio-based polyethylene. The term "bio-based" as used in the description indicates the inclusion of some component that derives from a material derived from renewable biological resources. The minimum bio-based content of the bio-polyethylene (bio-PE) may be greater than or equal to 50% by weight, specifically 60% by weight, more specifically 70% by weight, and even more specifically 80% by weight. Bio-polyethylene (bio-PE), also known as renewable polyethylene, is made out of ethanol, which becomes ethylene after a dehydration process. It can be made from various feedstocks including sugar cane, sugar beet and wheat grain. The bio-polyethylene (bio-PE) may be a low-density polyethylene, a linear low-density polyethylene, a high-density polyethylene, an ultra-high-molecular-weight polyethylene, a cross-linked polyethylene, a high density crosslinked polyethylene, a medium density polyethylene, a very low density polyethylene, as well as their copolymers and mixtures thereof. The bio-polyethylene (bio-PE) may be more specifically a linear low density polyethylene, for example the green linear low density polyethylene commercialized by Braskem under the reference SLH218. The bio-polyethylene (bio-PE) may have a density ranging from 0.9 to 1.0.

The mixture of biodegradable thermoplastic polymers serves as a matrix for the handle for razor and makes it possible to manufacture the handle by injection and to provide good mechanical properties such as resilience and impact resistance. The content of the mixture of PLA and bioplastic polymer in the handle may range from 50 to 95%, specifically from 60 to 92%, more specifically from 70 to 90%, and even more specifically from 80 to 90%, by weight relative to the total weight of the handle for razor.

The handle further comprises mineral fillers chosen in the group consisting of calcium carbonate and shells of shellfish. These mineral fillers may not contain $SiO_2$; in particular, they are shells of shellfish, specifically oyster shells or scallop shells, and more specifically crushed (or milled) oyster shells, for example commercially available from NaturePlast. The mineral fillers may be combined with vegetable fillers such as wood, wheat, flax, and seagrass, more specifically in the form of fibers. Thus, in some embodiments, the handle may comprise additional fillers to the mineral fillers, being of different nature from the mineral fillers such as vegetable fillers, e.g. wood, wheat, flax, and seagrass.

The content of mineral fillers in the handle may range from 5 to 40%, specifically from 7 to 30%, more specifically from 10 to 20%, and in particular 15%, by weight relative to the total weight of the handle for razor.

The handle may further comprise an additive c) chosen in the group consisting of vegetable fillers, blowing agents, adhesion promoters, dyes, pigments, lubricants, slip agents such as stearates (calcium stearate for example) and/or stearamide, compatibilizers, performance modifiers of PLA (melt enhancers which improve the strength/consistency of the extrusion melt), in particular acrylics, nucleating agents, glass microspheres, and their mixtures.

The additive(s) may represent from 0.1 to 10%, and specifically from 3 to 8%, by weight relative to the total weight of the handle for razor.

The handle for razor may be made of a composition wherein the sum of the weight % of a) (blend of PLA/bioplastic polymer), b) (mineral fillers), and optional c) (optional additive) represents 100%.

The handle for razor may comprise a blowing agent. The presence of a blowing agent reduces the amount of material required, thus making the composition an economically viable solution when compared to fossil based plastic compositions. The use of a blowing agent also reduces the amount of material that need to be processed and cooled, thus accelerating the cooling time required to ejected the handle from the injection machine. The blowing agent may consist, for example, of expandable and impervious particles, the wall of which is made of an extensible polymer material. Under the effect of temperature, a chemical or physical reaction occurs within the particles, causing an increase in the internal volume of the particles and their expansion.

Thus, the blowing agent may be chosen from microspheres having a shell and enclosing a gas or a gas mixture. An increase in temperature causes an increase in the internal pressure of the microspheres that swell to a size that can be multiplied by five or more. Depending on the desired result of flexibility, weight, and any other property of the material in which the blowing agent is incorporated, the expansion is completed or not.

The blowing agent may represent from 0.1 and 5%, and more specifically from 0.5 and 3%, by weight relative to the total weight of the handle for razor. The blowing agent may be chosen in the group consisting of citric acid, sodium bicarbonate, and mixture thereof, for example commercially available from ADEKA.

The handle for razor may also comprise an adhesion promoter.

The adhesion promoter may represent from 0.1 to 10%, specifically from 1 to 6%, more specifically from 2 to 5%, and even more specifically from 1 to 3%, by weight relative to the total weight of the handle for razor. The adhesion promoter makes it possible to improve the adhesion between the biodegradable thermoplastic polymer (mixture of PLA and bioplastic polymer) and the mineral fillers.

The adhesion promoter may be a PLA grafted with maleic anhydride (PLA-g-MAH), for example commercialized by NaturePlast or NatureWorks.

The handle may further comprise dyes and/or pigments such as red iron oxide.

The content of dyes and/or pigments may range from 0.1 to 10% by weight, and specifically from 2.5 to 5% by weight, relative to the total weight of the handle for razor.

The present disclosure also provides a method of manufacturing an above-defined handle for razor. The method includes the step of injecting in a dedicated mold (injection molding) the above-defined composition comprising:

a) from 60 to 95% by weight of a mixture of PLA and a bioplastic polymer chosen in the group consisting of polybutylene adipate terephtalate (PBAT), bio-polyethylene (bio-PE), and polybutylene succinate (PBS), wherein the weight ratio PLA/bioplastic polymer ranges from 60/40 to 90/10, and b) from 5 to 40% by weight of mineral fillers chosen in the group consisting of calcium carbonate and shells of shellfish, specifically oyster shells or scallop shells, and more specifically crushed oyster shells, the weight % being relative to the total weight of the handle for razor.

The method for manufacturing the handle for razor may comprise the step of adding and mixing, in a molding injector, the PLA, the bioplastic polymer chosen in the group consisting of polybutylene adipate terephtalate (PBAT), bio-polyethylene (bio-PE), and polybutylene succinate (PBS), the mineral fillers chosen in the group consisting of calcium carbonate and shells of shellfish, specifically oyster shells or scallop shells, and more specifically crushed oyster shells, and the optional additive c), in the above-defined proportions. The components may be mixed and melted at a temperature ranging from 160 to 220° C., specifically from 175 to 205° C., and more specifically from 180 to 200° C. The components may be mixed and melted under a pressure ranging from 600 to 1000 bar, specifically from 700 to 900 bar, and more specifically about 800 bar. The obtained mixture may then be injected into a mold for razor handle. At the end of the injection, the obtained composition may be cooled until a temperature of 25-35° C., specifically 30° C., during 17-22 seconds, specifically 18 seconds.

The present disclosure also provides a razor comprising an above-defined handle for razor and at least one razor blade.

The razor may have a length ranging from 80 to 150 mm, specifically from 100 to 130 mm, and more specifically around 115 mm. The razor may have a width at the connector portion 18 ranging from 15 to 25 mm, and specifically around 20 mm. The razor may have a width at the body 16 ranging from 8 to 15 mm, and specifically from 10 to 12 mm.

The present disclosure also provides a skincare kit comprising an above-defined handle and a razor cartridge, wherein the cartridge may be fixedly or removably attached to the handle.

Thanks to the combination of PLA/bioplastic polymer and mineral fillers, the consumption of fossil based raw materials in the above-defined handle for razor is reduced and the cooling time accelerated. The Heat Deflection Temperature (HDT) is also increased allowing the above-defined handle for razor to resist deformations when immersed in hot water.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

EXAMPLES

Four handles for razor of compositions A, B, C and D, according to the disclosure, were prepared and compared to six comparative handles for razor of compositions E, F, G, H and I.

Composition A was a mixture of PLA (PBE 005-1 from NaturePlast)/PBS (PBE 003 from NaturePlast) in a weight ratio of 70/30, added with 10% by weight of crushed oyster shells (NaturePlast).

Composition B was a mixture of PLA (PBE 005-1 from NaturePlast)/PBS (PBE 003 from NaturePlast) in a weight ratio of 70/30, added with 20% by weight of crushed oyster shells (NaturePlast).

Composition C was a mixture of PLA (PBE 005-1 from NaturePlast)/bio-PE (SLH218 from Braskem) in a weight ratio of 80/20, added with 15% by weight of crushed oyster shells (NaturePlast).

Composition D was a mixture of PLA (PBE 005-1 from NaturePlast)/PBAT (PBE 006 from NaturePlast) in a weight ratio of 80/20, added with 15% by weight of crushed oyster shells (NaturePlast).

Composition E (comparative) consisted of a composition of pure PLA (PBE 005-1 from NaturePlast).

Composition F (comparative) was a mixture of PLA (PBE 005-1 from NaturePlast)/PBS (PBE 003 from NaturePlast) in a weight ratio of 80/20.

Composition G (comparative) was a mixture of PLA (PBE 005-1 from NaturePlast)/PBS (PBE 003 from NaturePlast) in a weight ratio of 70/30.

Composition H (comparative) consisted of a composition of recycled polystyrene (r-PS) (rPS65W from Galloo Plastics).

Composition I (comparative) consisted of a composition of improved recycled polystyrene (r-PS) (fish box Acteco Q07).

The handles for razor of compositions A to I were prepared by injection molding in an Engel ES 330H/80V/200 HL—2F machine. The various ingredients of the compositions were mixed and melted at a temperature varying from 150 to 200° C. and a pressure of 790 bar, and then injected into a mold for razor handle. At the end of the injection, the composition was cooled during 19 seconds until a temperature of 30° C.

The dimensions of the mold of the razor handles were as follows:
Length: 114.09 mm
Width at head connection point: 19.87 mm
Width at grip area (barrel): 10.78 mm The obtained handles for razors correspond to those of the commercial razors BIC 3.

The performances of the obtained materials of compositions A to I were tested on test bars according to the following tests:

The flexural modulus of the materials was evaluated according to standard ISO 178:2019. This test assessed the strength and the crack resistance of the materials.

The characteristics of the test were as follows:
Equipment: Dynamometer LLOYD-AMETEK Instrument type, U-bracket span of 6 cm, Sensor ADAMEL DY20 Chatillon Instrument type TCD110 50 daN
Descent speed of sensor: 50 mm·min$^{-1}$
Operating method:
1. Turn on the dynamometer.
2. Locate the sensor in the up position.
3. Fix the pencil on the U-bracket.
4. Go down the needle.
5. Record the results expressed in MPa.

The Charpy unnotched impact strength of the materials was evaluated according to standard ISO 179-1:2010. This test assessed the resistance to impact (resilience) of the materials.

The characteristics of the test were as follows:
Equipment: Impact II pendulum (CEAST)
Hammer: 15J
Distance between supports: 62 mm
Sampling: specimen type 1A (molded specimen)
Position: upright
Packaging: minimum 24 h at 23° C.±2° C. and 50% RH±10% RH
Test temperature: 23.7° C.
Test hygrometry: 27%
The results were expressed in kJ·m$^{-2}$.

The viscosity or Melt Flow Index (MFI) was measured according to standard ISO 1133:2011, method B.

The characteristics of the test were as follows:
Steaming: 18 h at 90° C.
Equipment: Modular Melt Flow Tester (CEAST)
Diameter of the capillary nozzle: 2.095 mm
Length of the capillary nozzle: 8 mm
Test temperature: 200° C.
Load applied: 5.0 kg
Time interval: 30 seconds
The results were expressed in g/10 min.

The density was measured according to standard ISO 1183:2012, method A (immersion method).

The characteristics of the test were as follows:
Equipment: Analytical balance ALS/PLS-A01 (KERN)—Density measurement set
Liquid: Distilled water
Test temperature: 23° C.
Sampling: Injected piece
The results were expressed in g·cm$^{-3}$.

The Heat Deflection Temperature (HDT) was measured according to standard ISO 75-2:2013-08.

The characteristics of the test were as follows:

Load applied: 1.80 MPa

Size of the specimen: specimen type 1A according to DIN EN ISO 527-2

The results were expressed in ° C.

The crystallisation temperature was determined by Differential Scanning Calorimetry (DSC) according to standard ISO 11357-3:2018-07.

The characteristics of the test were as follows:

Protocol: Two heating cycles with controlled cooling cycle (10 K·min$^{-1}$), recording of peak, and determination of onset temperature of crystallisation.

The results were expressed in ° C.

The performances of the materials of compositions A, B, C, and D, according to the disclosure, and the performances of the comparative materials of compositions E, F, G, H and I are summarized in the following Table 1:

TABLE 1

| | Compositions | | | | | | | | |
|---|---|---|---|---|---|---|---|---|---|
| | A | B | C | D | E | F | G | H | I |
| Flexural modulus (MPa) | 3029 | 3551 | 3009 | 3232 | — | 4454 | 2557 | 1800-2200 | 2500 |
| Resistance to impact (resilience) (kJ · m$^{-2}$) | 23.7 | 17.6 | 17.3 | 21.7 | — | 16 | 63.8 | 8 | 6 |
| MFI (g/10 min) | 25.88 | 77.3 | 6.08 | 5.35 | — | 5.63 | 18.29 | 5-8 | 5-8 |
| Density (g · cm$^{-3}$) | 1.28 | 1.39 | — | — | — | — | 1.26 | 1.05 | 1.05 |
| HDT measurement (° C.) | — | — | 53 | — | 51 | — | — | — | — |
| Crystallisation temperature (° C.) | — | — | 111 | — | 108 | — | — | — | — |

The results presented in Table 1 show the best compromise in terms of crack resistance and resistance to impacts for the materials of razor handles made with the claimed compositions with respect to those made of the comparative compositions. In particular, compared to r-PS—which is another material with sustainability benefits—the materials of razor handles made with the claimed compositions show better impact resistance. The addition of vegetable fillers also lead to higher flexural modulus with respect to the comparative compositions, provided materials of razor handles with increased resilience to deformation due to flexural stresses.

The material for razor handle made of the composition C also shows a better resilience to water, and thus an improved resistance to deformation in hot water (HDT measurement and crystallisation temperature) compared to the comparative material of razor handle made of composition E.

The invention claimed is:

1. A handle for a razor that is made of a composition comprising:
   a) from 80 to 90% by weight of a mixture of polylactic acid (PLA) and bio-polyethylene (bio-PE), wherein the weight ratio polylactic acid/bio-polyethylene (bio-PE) polymer ranges from 70/30 to 80/20; and
   b) from 10 to 20% by weight of mineral fillers chosen in the group consisting of calcium carbonate and crushed shells of oyster,
wherein the mineral fillers are present in an amount sufficient to increase the heat deflection temperature and the crystallization temperature of the mixture, and the weight % being relative to the total weight of the handle for the razor.

2. The handle for the razor according to claim 1, wherein the composition further comprises an additive of one or more vegetable fillers.

3. The handle for the razor according to claim 2, wherein the additive comprises a blowing agent.

4. The handle for the razor according to claim 2, wherein the additive comprises an adhesion promoter.

5. The handle for the razor according to claim 2, wherein the additive comprises vegetable fillers.

6. The handle for the razor according to claim 2, wherein the additives represent from 0.1 to 10% by weight relative to the total weight of the handle for razor.

7. A method for manufacturing a handle for a razor comprising the step of injection of a composition in a dedicated mold, wherein the composition comprising:
   a) from 80 to 90% by weight of a mixture of polylactic acid (PLA) and bio-polyethylene (bio-PE), wherein the weight ratio polylactic acid/bio-polyethylene (bio-PE) ranges from 70/30 to 80/20; and
   b) from 5 to 40% by weight of mineral fillers chosen in the group consisting of calcium carbonate and shells of oyster,
wherein the mineral fillers are present in an amount sufficient to increase the heat deflection temperature and the crystallization temperature of the mixture, and the weight % being relative to the total weight of the handle for the razor.

8. The method according to claim 7, wherein the composition further comprises one or more vegetable fillers.

9. The method according to claim 8, wherein the additives represent from 0.1 to 10% by weight relative to the total weight of the handle for the razor.

10. The method according to claim 7, wherein the components of the composition are mixed and melted at a temperature ranging from 160 to 220° C. and under a pressure ranging from 600 to 1000 bar, before the step of injection.

11. A skincare kit comprising the handle for the razor according to claim 1 and a razor cartridge, wherein the cartridge is fixedly or removably attached to the handle.

12. A handle fora razor that is made of a composition comprising:
   a) from 60 to 95% by weight of a mixture of polylactic acid (PLA) and a bio-polyethylene (bio-PE), wherein the weight ratio polylactic acid/bio-PE polymer ranges from 60/40 to 90/10; and
   b) from 5 to 40% by weight of mineral fillers selected from the group consisting of calcium carbonate and crushed shells of oyster,
wherein the mineral fillers are present in an amount sufficient to increase the heat deflection temperature and the crystallization temperature of the mixture, and wherein the weight % is relative to the total weight of the handle for the razor.

* * * * *